(12) United States Patent
Passier et al.

(10) Patent No.: US 7,542,784 B2
(45) Date of Patent: Jun. 2, 2009

(54) HIGH QUALITY, LOW POWER, WIRELESS AUDIO SYSTEM

(75) Inventors: Chris Passier, Kanata (CA); Ralph Mason, Ottawa (CA); Brent Allen, Manotick (CA)

(73) Assignee: Kleer Semiconductor Corporation, Ottawa, Ontario (CA)

( * ) Notice: Subject to any disclaimer, the term of this patent is extended or adjusted under 35 U.S.C. 154(b) by 694 days.

(21) Appl. No.: 11/065,995

(22) Filed: Feb. 25, 2005

(65) Prior Publication Data

US 2006/0193273 A1 Aug. 31, 2006

(51) Int. Cl.
  *H04B 1/38* (2006.01)
  *H04B 7/00* (2006.01)
  *H04M 1/00* (2006.01)
  *H04H 20/47* (2008.01)

(52) U.S. Cl. .................. 455/557; 455/556.1; 455/575.2; 455/41.2; 381/2

(58) Field of Classification Search ................ 455/41.1, 455/41.2, 41.3, 575.2, 556.1, 557; 381/2, 381/11, 311, 334, 77, 74; 709/94
  See application file for complete search history.

(56) References Cited

U.S. PATENT DOCUMENTS 6,728,585 B2 * 4/2004 Neoh ........................... 700/94

2005/0032500 A1 2/2005 Nashif et al.
2005/0123143 A1 * 6/2005 Platzer et al. ................... 381/2
2006/0111145 A1 * 5/2006 Kelly et al. .................. 455/557

FOREIGN PATENT DOCUMENTS

| EP | 0637796 | 2/1995 |
| EP | 1443737 | 8/2004 |
| WO | WO 03/098901 | 11/2003 |

* cited by examiner

*Primary Examiner*—Nick Corsaro
*Assistant Examiner*—Shannon R Brooks
(74) *Attorney, Agent, or Firm*—Cassan Maclean

(57) ABSTRACT

The invention relates to the field of wireless communications and more specifically to an high quality, low power wireless audio system. More specifically, the invention comprises an audio source for receiving audio signals (e.g. music) and audio status information (e.g. song title) from a first external device (e.g. an MP3 player) and transmitting the audio signals and the audio status information over a wireless connection; and at least one audio sink for receiving the audio signals and said audio status information from the audio source and communicating the audio signals and the audio status information to a second external device (e.g. headphones), wherein a specified one of the at least one audio sink receives audio control information (e.g. pause) from the second external device and transmits said audio control information to said audio source via said wireless connection. Among other features, the wireless audio system of the present invention incorporates dynamic channel selection as well as dynamic adjustment of the transmission interval to ensure enhanced audio quality using the lowest possible power.

44 Claims, 15 Drawing Sheets

| | Stable Audio Buffer Level | Deteriorating Audio Buffer Level |
|---|---|---|
| High Channel Energy | Good Channel | Interference<br>1. Activate short packet interval<br>2. Dynamic channel switch |
| Low Channel Energy | Approaching Out Of Range<br>1. Signal user | Out Of Range<br>1. Activate short packet interval<br>2. Signal user |

FIGURE 13

HIGH QUALITY, LOW POWER, WIRELESS AUDIO SYSTEM

BACKGROUND OF THE INVENTION

1. Field of Invention

The invention relates to the field of wireless communications and more specifically to an enhanced wireless audio system.

2. Description of the Related Prior Art

As shown in FIG. 1, in its simplest form, a typical portable digital wireless audio system comprises two devices: a personal wireless audio player 100 which communicates with a wireless remote control 140 or wireless headphones 120. The audio data is a unidirectional stream from personal wireless audio player 100, the audio source, to wireless headphones 120, the audio sink. In the case of wireless remote control 140, personal wireless audio player 100, the audio source, may also send LCD display information to wireless remote control 140, the audio sink, and the audio sink will return packets containing key-press information (e.g. audio track selection).

Current radio technology that has the capacity to carry high quality stereo audio consumes too much power to make the use of wireless headphone 120 or wireless remote control 140 in conjunction with wireless personal audio player 100 successful in the marketplace. Presently, most personal audio players such as CD players, Mini-Disk players, and MP3 players are not wireless with a headphone or remote control being corrected to the player via a hard wire. Such personal audio players are intended to be mobile, (i.e. easily carried by the user) and are powered from a battery to allow for such portability. Currently, the vast majority of such personal audio products use one battery and the subtending headphone (and possibly remote control) receive their power from the battery in the player through the hard wire.

The hard wire connecting the player to the headphone and/or remote control is often an inconvenience to the user. For example, when the user wishes to put the player into a pocket, backpack or briefcase, the wires to the headphone or remote control must extend out to connect to the headphone or remote control. In addition, the wires tend to get tangled or snagged.

If the wire extending from the player is eliminated, the headphone/remote control then require their own power and one of the components that the battery will have to supply is the radio interface. Personal audio manufacturers have stated that wireless headphones and remote controls must be small, lightweight, and operate for 100 hours before the battery needs to be replaced. 100 hours of operation from a 450 mAHr 3v supply (2 CR2032 Li coin-cell batteries) requires the headphone and/or remote control to consume an average of no more than about 6 mA from a 2v supply, of which about 4 mA is available for the radio. Current radio technology consumes on the order of 20 mA or more so does not meet the standard suggested by manufacturers.

While power consumption is the main hurdle facing wireless (i.e. radio) solutions for personal audio applications, such solutions must also deliver high quality audio, deal with interference from a plethora of other radio sources, and be small and inexpensive.

SUMMARY OF THE INVENTION

In order to overcome the deficiencies of the prior art there is provided a high quality, low power personal wireless audio system which incorporates a variety of enhancements which serve to improve the overall audio experience for the user. Such features as acknowledged packet transmission with retransmission, dynamic adjustment of the transmission interval between the audio source and sink, improved audio synchronization, lossless compression, dynamic channel selection and switching, and dynamic adjustment of the transmit power allow the wireless audio system to quickly overcome identified radio interference and transmit a signal whose strength is adjusted according to the surrounding transmission medium.

In accordance with one aspect of the invention there is provided a wireless audio system comprising: (a) an audio source for receiving audio signals and audio status information from a first external device and transmitting the audio signals and the audio status information over a wireless connection; and (b) at least one audio sink for receiving the audio signals and the audio status information from the audio source and communicating the audio signals and the audio status information to a second external device, wherein a specified one of the at least one audio sink receives audio control information from the second external device and transmits the audio control information to the audio source via the wireless connection.

In accordance with a second aspect of the invention, there is provided an audio source comprising: (a) a source packet formatter and buffer communicating with a first external device, wherein the source packet formatter creates a plurality of source transmit packets containing audio signals and audio status information, and wherein the source buffer stores the plurality of source transmit packets prior to transmission to an audio sink; (b) a source transmitter communicating with the source packet formatter and buffer for receiving the plurality of source transmit packets from the source buffer and transmitting the plurality of source transmit packets to the audio sink every defined unit of time; (c) a source audio synchronizer communicating with the source transmitter for defining the unit of time for the source transmitter; (d) a source receiver for receiving audio control information from the audio sink, wherein the audio control information is in the form of a plurality of sink transmit packets, and wherein the source receiver communicates with the source transmitter to coordinate the receiving and transmitting within respective ones of said defined units of time; (e) a source packet de-formatter communicating with the source receiver for receiving the plurality of sink transmit packets and extracting the audio control information; and (f) a source channel quality monitor communicating with the source packet de-formatter and source transmitter for monitoring a specified one of a plurality of available channels.

Preferably, if an analog audio signal is delivered from the first external device the wireless audio system further comprises an analogue-to-digital converter (ADC) communicating with the first external device, and wherein a source audio sampling clock signal generated by the source audio synchronizer is fed to the ADC.

More preferably, the wireless audio system of further comprises a compression module communicating with the ADC for compressing digital audio signals outputted by the ADC.

In accordance with a third aspect of the invention, there is provided an audio sink comprising: (a) a sink receiver for receiving a plurality of source transmit packets from an audio source every defined unit of time, wherein said plurality of source transmit packets comprise audio signals and audio status information; (b) a sink packet de-formatter and buffer communicating with the sink receiver, wherein the sink packet de-formatter extracts the audio signals and the audio status information from the source transmit packets, and wherein the sink buffer stores the extracted audio signals and the audio status information; (c) a sink audio synchronizer communicating with the sink receiver for defining the unit of time for the sink receiver; (d) a sink packet formatter communicating with a second external device for creating a plurality of sink transmit packets containing audio control information; (e) a sink transmitter communicating with the sink packet formatter for transmitting the plurality of sink transmit packets, wherein the sink receiver communicates with the sink transmitter to coordinate the receiving and transmitting within specified ones of the defined units of time; and (f) a sink channel quality monitor communicating with the sink packet de-formatter and buffer and the sink receiver for monitoring a specified one of a plurality of available channels.

Preferably, if an analog audio signal is required by the second external device, the wireless audio system further comprises a digital-to-analogue converter (DAC), and wherein a sink audio sampling clock signal generated by the sink audio synchronizer is fed to said DAC.

More preferably, the wireless audio system further comprises a decompression module communicating with the sink packet de-formatter and buffer for decompressing the digital audio signals received from the sink buffer.

The advantages of the invention are now readily apparent. The enhanced wireless audio system provides uninterrupted audio play using the lowest possible power through a variety of integrated features which operate seamlessly to provide a user with a superior wireless audio experience.

Further features and advantages of the invention will be apparent from the detailed description which follows together with the accompanying drawings.

BRIEF DESCRIPTION OF THE DRAWINGS

A better understanding of the invention will be obtained by considering the detailed description below, with reference to the following drawings in which:

FIG. 13 depicts a decision matrix used by the Channel Quality Monitor while transmission is active to determine the appropriate interference avoidance action;

DESCRIPTION OF THE PREFERRED EMBODIMENT

Figure 1:
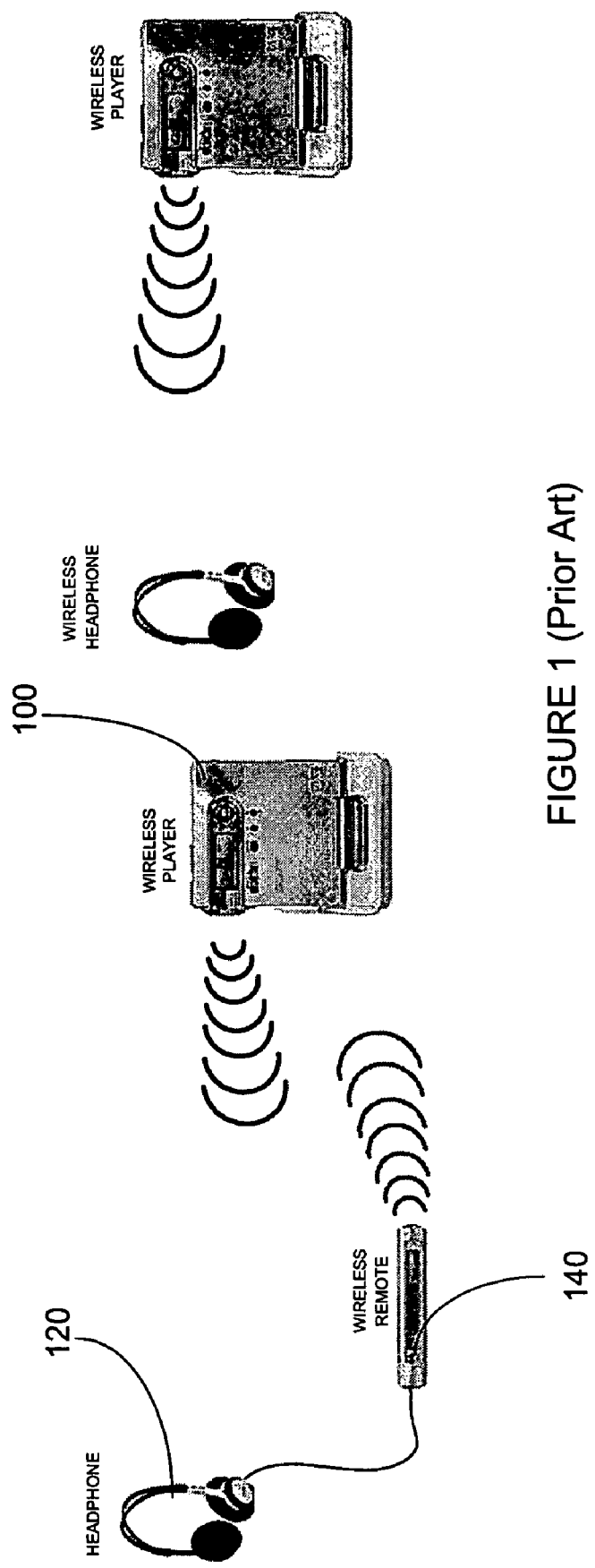
FIG. 1 depicts a graphical representation of a typical wireless digital audio system.
Figure 2:
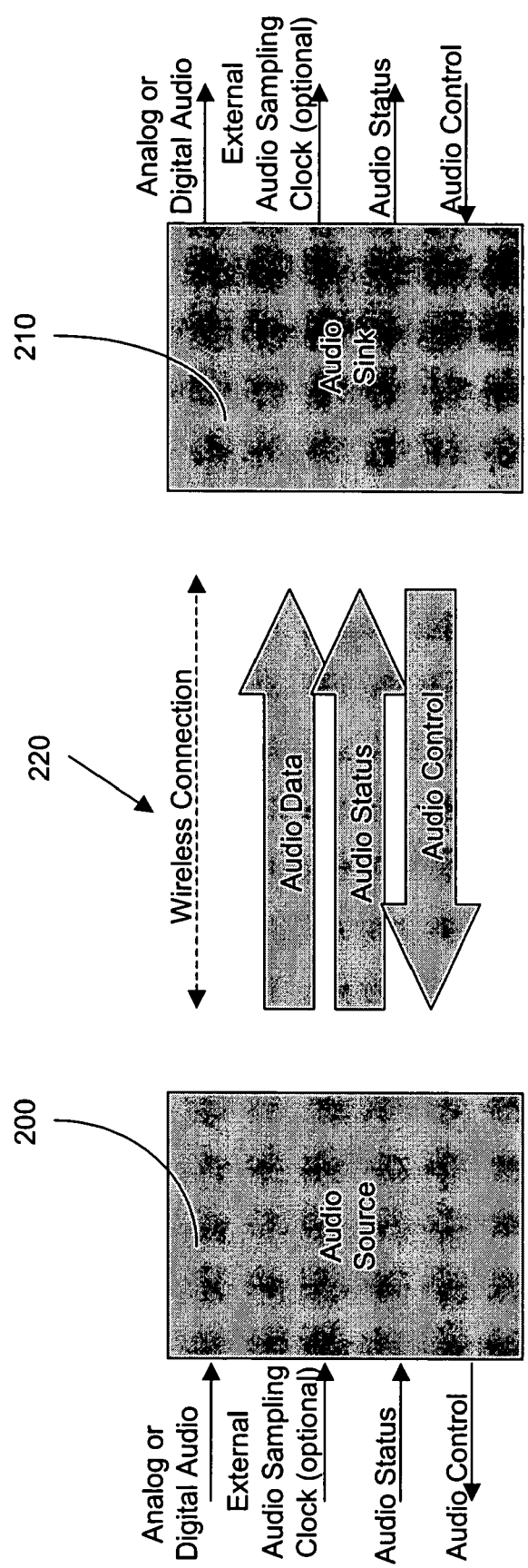
FIG. 2 depicts a block diagram of wireless digital audio system.

Referring to FIG. 2, the wireless audio system of the present system generally comprises an Audio Source 200, Audio Sink 210 and wireless connection (shown generally at 220):

(a) Audio Source 200 receives analog or digital audio and audio status information from an external device (e.g. audio player—not shown) and transmits it to audio sink 210 over wireless connection 220, and receives audio control information from audio sink 210 over wireless connection 220, and transmits it to an external device. Audio status includes information about the audio being transmitted, e.g. song title, artist, etc.. Audio status may also include information about the audio player, e.g. playing, stopped, rewinding, etc.. Audio control includes information that controls Audio Source 100, e.g. play, stop, rewind, fast forward, skip, pause, etc.;

(b) Audio Sink 210 receives audio data and audio status information from audio source 200 over wireless connection 220 and transmits to an external device (e.g. headphone), and receives audio control information from an external device and transmits it to Audio Source 200 over wireless connection 220; and (c) wireless connection 220 between Audio Source 226 and Audio Sink 210. Wireless connection 220 is assumed to use one channel of a wireless shared media such as radio and the wireless shared media contains multiple channels.

Figure 3:
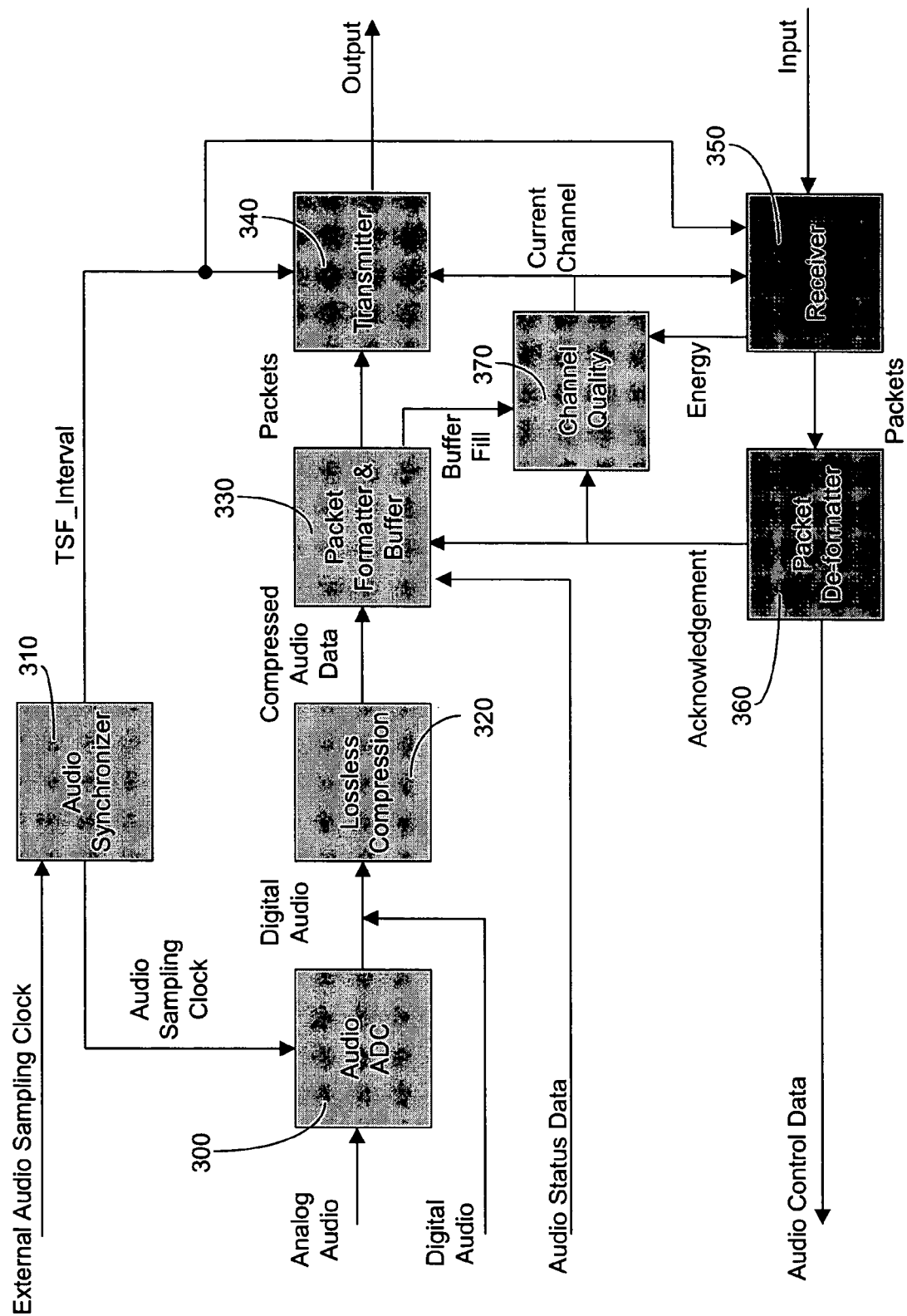
FIG. 3 depicts a block diagram of the audio source of FIG. 2.

Referring to FIG. 3, Audio Source 200 is comprised of:

(a) an Audio Analog-to-Digital Converter (ADC) 300 that converts the analog data received from an external device such as audio player to digital data using the sampling clock supplied by Audio Synchronizer 310. Audio ADC 300 can be omitted if digital data is supplied directly (e.g. from a compact disc player with digital output);

(b) an Audio Synchronizer 310 that generates the audio sampling clock and the Transport Superframe Interval (TSF_Interval) such that one can be derived from the other by a known relationship;

(c) a Lossless Compression Module 320 that reduces the average bit rate of the digital audio data by detecting and eliminating redundant information in such a way that the original digital signal can be completely recovered under normal conditions;

(d) a Packet Formatter & Buffer 330 that creates packets containing compressed audio data, audio status data, and any overhead necessary to support packet delineation, error detection, wireless link management, etc. The packets are buffered awaiting transmission by the radio. Packet Formatter & Buffer 330 will only present a new packet to a Transmitter 340 once the previous packet has been Acknowledged by Audio Sink 210;

(e) a Transmitter 340 that transmits the packet presented by Packet Formatter & Buffer 330 every TSF_interval unit of time. Note that since Audio Source 200 is never transmitting and receiving on the wireless shared media at the same time, there may be shared circuitry between Transmitter 340 and Receiver 350;

(f) a Receiver 350 that receives a packet from Audio Sink 210 after Transmitter 340 transmits its packet to Audio Sink 210. Receiver 350 performs error detection on the packet and if it is not corrupted it is passed on to Packet De-formatter 360. Since Audio Source 200 is never transmitting and receiving on the wireless shared media at the same time, there may be shared circuitry between Transmitter 340 and Receiver 350;

(g) a Packet De-formatter 360 that extracts the audio control data and acknowledgement from the received packet. Acknowledgements are forwarded to Packet Formatter & Buffer 330 which uses the information to determine whether to present a new packet to Transmitter 340; and (h) a Channel Quality Monitor 370 that continuously monitors the quality of the current channel, controls Dynamic TSF Interval switching, maintains a Preferred Channel Sequence, and controls Dynamic Channel Switching.

Figure 4:
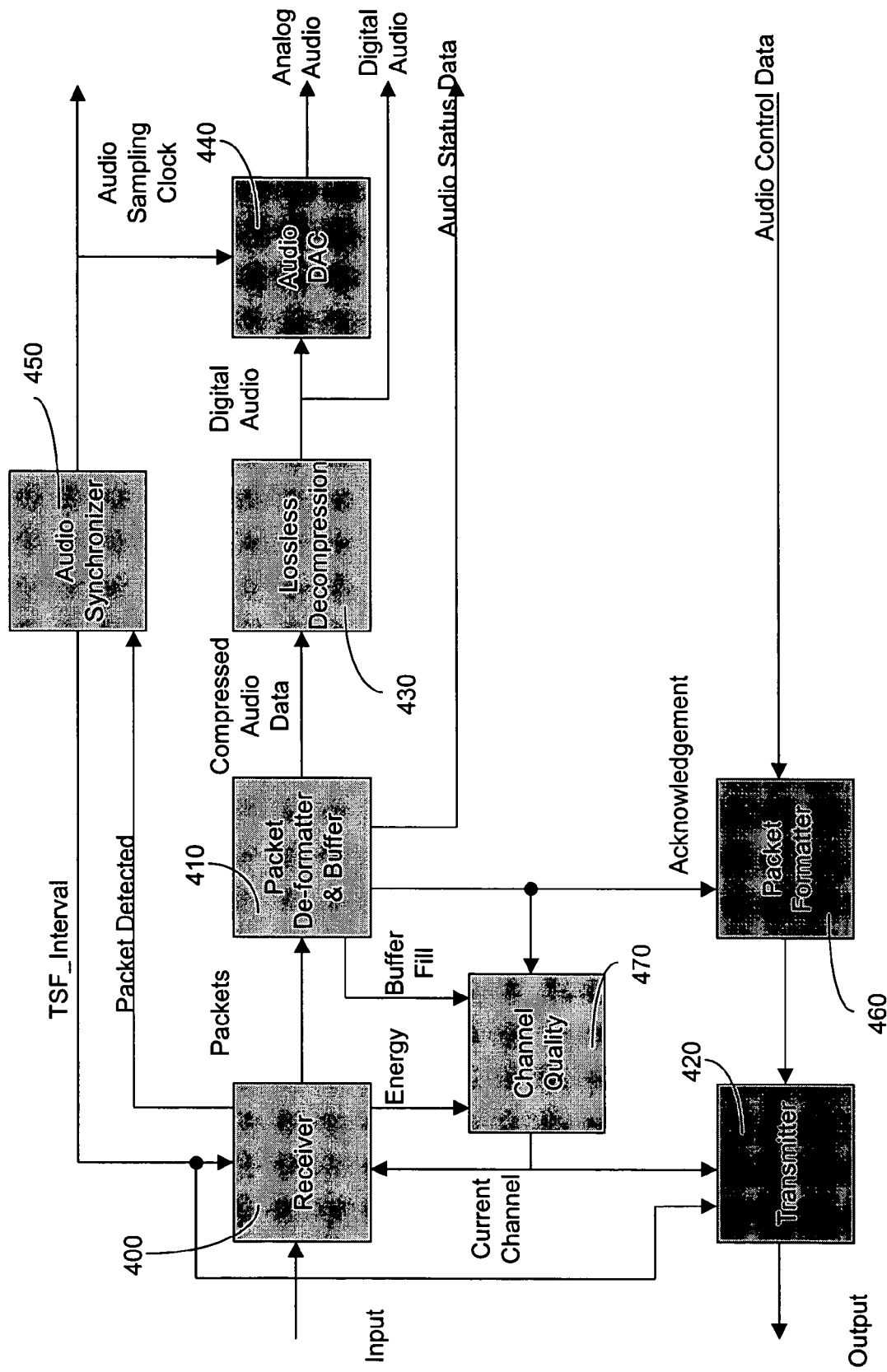
FIG. 4 depicts a block diagram of the audio sink of FIG. 2.

Referring to FIG. 4, Audio Sink 210 is comprised of:

(a) a Receiver 400 that receives a packet every TSF_Interval. Receiver 400 performs error detection on the packet and if it is not corrupted it is passed on to a Packet Buffer & De-formatter 410. Since Audio Sink 210 is never transmitting and receiving on the wireless shared media at the same time, there may be shared circuitry between Transmitter 420 and Receiver 400;

(b) a Packet De-formatter & Buffer 410 that extracts the audio data and audio status data and buffers the audio data to maintain smooth audio playback;

(c) a Transmitter 420 that transmits the packets to Audio Source 200 immediately after the packet from Audio Source 200 is received every TSF_Interval. Since Audio Sink 210 is never transmitting and receiving on the wireless shared media at the same time, there may be shared circuitry between Transmitter 420 and Receiver 400;

(d) a Lossless Decompression Module 430 that reconstitutes the original digital audio data from the compressed data received in the packet;

(e) an Audio Digital-to-Analog Converter (DAC) 440 that converts the digital audio data to analog audio using the sampling clock supplied by an Audio Synchronizer 450;

(f) an Audio Synchronizer 450 that generates the TSF_Interval and the Audio Sampling Clock from the Packet Detected signal received from Receiver 400;

(g) a Packet Formatter 460 that creates packets containing Audio Control Data and Acknowledgements; and (h) a Channel Quality Monitor 470 that continuously monitors the quality of the current channel, controls Dynamic TSF Interval switching, maintains a Preferred Channel Sequence, and controls Dynamic Channel Switching.

Wireless Shared Media Connection

Figure 5:
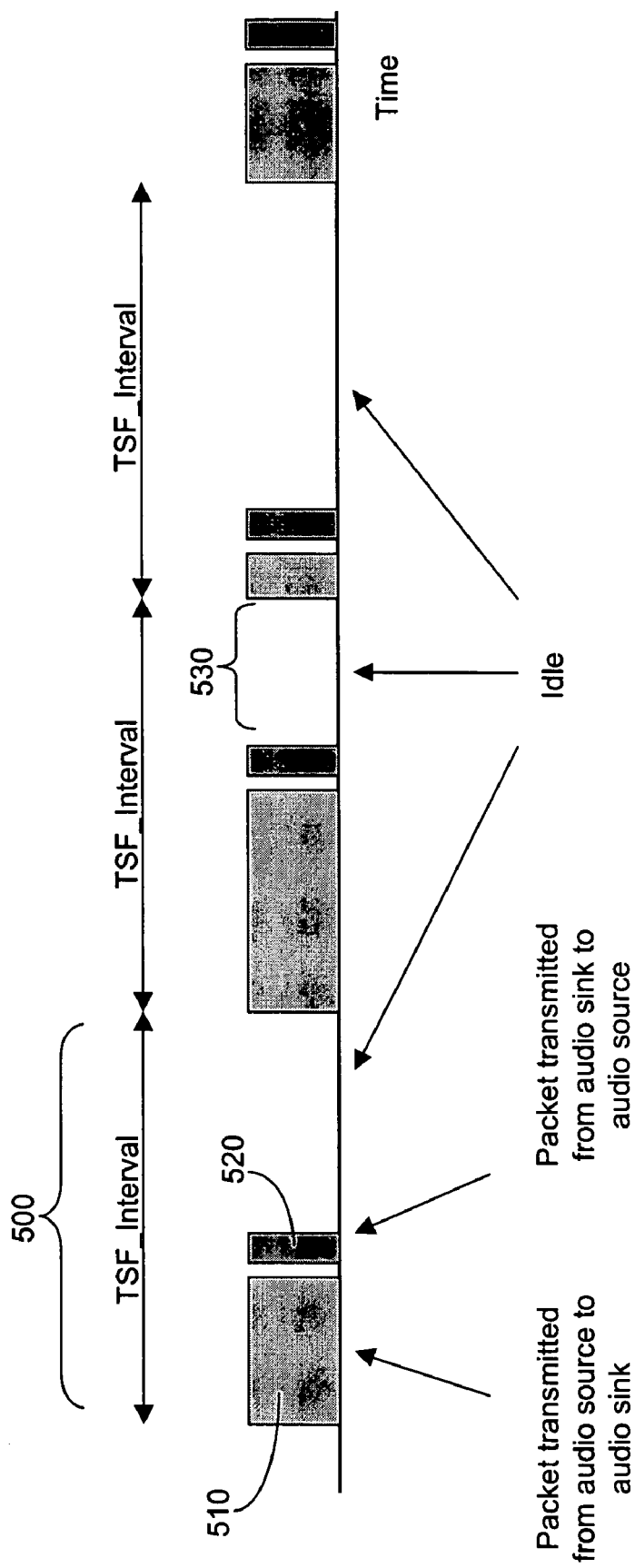
FIG. 5 depicts a wireless media duty cycle in accordance with the present invention.

FIG. 5 depicts the wireless shared media duty cycle. In the solution of the present invention a time division duplex transmission scheme is used to control access to the wireless shared media. This means that the same wireless shared media is used to send packets from Audio Source 200 to Audio Sink 210 and from Audio Sink 210 to Audio Source 200, but not at the same time. Thus packets 'ping-pong' back and forth between the two ends.

Transport SuperFrame Interval (TSF_Interval) (hereinafter "TSF 500") is a period of time of defined length that repeats continuously while Audio Source 100 is connected to Audio Sink 210. Within that period of time, there is time allocated for Audio Source 200 to access the wireless shared media to send an audio source packet 510 to Audio Sink 210, and for Audio Sink 210 to access the wireless shared media to send an audio sink packet 520 to Audio Source 200. Since the direction of transmission changes between these two periods, there is time allocated to allow the radios to switch between transmit mode and receive mode and vice-versa. Also, since TSF 500 may contain more time than is required for the transmission of all data, there may also be an idle period 530 allocated where there is no radio transmission.

The start of audio source packet 510 is triggered by the start of TSF 500. This packet is always transmitted, regardless of whether there is audio data in it or not. It is also a variable length packet with a defined maximum size. Audio Sink 210 transmits its audio sink packet 520 beginning immediately after the end of audio source packet 510 (after allowing time for the radios to switch direction). Audio sink packet 520 is always transmitted and is also variable length with a defined maximum, but is typically much smaller than audio source packet 510.

An audio synchronization function performed by Audio Synchronizer 310 in Audio Source 200 controls the length of TSF 500. This information is communicated to Audio Sink 210 in audio source packet 510 overhead. The length of TSF 500 must take in account many competing factors as listed in the following table. The objective is to maximize the capacity available to audio, while minimizing the audio rate by using lossless compression:

TABLE 1

| System Parameters | | | |
|---|---|---|---|
| Parameter | Description | Value | Units |
| Peak_Radio_Bit_Rate | The rate that bits are transmitted over the radio. | 2.4 | Mb/s |
| Max_Packet_Size | The maximum allowable packet size. | 1000.0 | bytes |
| Audio_Sampling_Clock | The sampling clock used in the analog to digital conversion of audio. | 44.1 | KHz |
| Ratio | The ratio of the audio sampling clock to the TSF frequency. | 176 | |
| TSF_Clock | The TSF frequency (1/TSF_Interval) | 250.6 | Hz |
| TSF_Interval | The length of the TSF in time. | 4.0 | msec |
| TSF_Bytes | The length of the TSF in bytes. | 1182.3 | bytes |
| TSF_OH | The amount of time during a TSF where data cannot be transmitted. | 200.0 | usec |

TABLE 1-continued

System Parameters

| Parameter | Description | Value | Units |
|---|---|---|---|
| TSF_OH_Bytes | TSF_OH in bytes. | 59.3 | bytes |
| Packet_OH_Bytes | The average amount of packet overhead. | 27.0 | bytes |
| Audio_Rate | The audio data rate. | 1.4 | Mb/s |
| Compression_Ratio | The average compression ratio. | 0.7 | |
| Audio_Sync_Packet_Size | The average size of the packet transmitted from audio sink to audio source. | 27.0 | bytes |
| Max_Audio_Source_Packet_Size | The maximum size of audio source packet taking into account overhead and audio sink packets. | 1000.0 | bytes |
| Compressed_Audio_Capacity_Bytes | The capacity available to transmit compressed audio data in bytes per TSF. | 973.0 | bytes |
| Compressed_Audio_Capacity | The capacity available to transmit compressed audio data. | 2.0 | Mb/s |
| Compressed_Audio_Rate | The capacity required to transmit the compressed audio. | 1.0 | Mb/s |
| Spare_Capacity | The capacity available for retransmission of corrupted packets. | 1.0 | Mb/s |

In the solution of the present invention, a radio interface that transmits and receives at a bit rate of approximately 2.4 Mb/s is used. TSF 500 is 4 msec. This is derived from the audio sampling clock (44.1 KHz) by dividing by 176. At 2.4 Mb/s, approximately 1183 bytes can be transmitted in 4 msec. However, of this 4 msec, 100 usec is reserved to allow for the radio to turn-on at tie start of TSF 500, and 100 usec is reserved to allow for the radio to switch directions (Rx<->Tx) This reduces the number of bytes that can be transmitted during a specified TSF 500 by about 59 bytes to 1124 bytes. Audio sink packet 520 consumes about 27 bytes leaving 1097 for audio source packet 510. The maximum packet size that is transmitted is 1000 bytes, therefore there will be idle time in every TSF 500. A 1000 byte packet transmitted every TSF represents about 2 Mb/s of compressed audio capacity. A 1.4 Mb/s audio stream compressed at an average ratio of 0.7 only requires about 1 Mb/s. Therefore, there is twice as much capacity available for compressed audio than is required. The surplus 1 Mb/s is available for the retransmission of corrupted packets. Essentially, there is sufficient capacity to transmit every audio source packet twice.

There are other factors driving the selection of these parameter values as will be discussed later. The proposed method ensures that Audio Source 200 and Audio Sink 210 never try to transmit on the radio at the same time, resulting in a conflict and loss of data. It also provides the timing coordination that ensures that one end is in receive mode while the other end is in transmit mode. The proposed method also allows a real-time trade-off between interference robustness and power consumption by adjusting the length of TSF 500 depending on how much interference is present. Finally, the proposed method allows the start of TSF 500 to be used as a frequency reference sent from Audio Source 200 to Audio Sink 210. This can be used to synchronize timing at Audio Sink 210.

Acknowledged Packet Transmission with Retransmission

As those skilled in the art will appreciate, acknowledged packet transmission methods allow a sender to get explicit acknowledgement that each packet it sent was correctly received by the receiver. If an acknowledgement is not received (either the original packet or the acknowledgement was lost or damaged), then the sender retransmits the packet. Thus the lost or damaged information gets replaced. This method is sometimes referred to as Sender-Based Repair. In conventional acknowledged packet transmission methods, the receiver of a good packet responds to the sender with an acknowledgement packet that contains an identifier of the received packet. The identifier would typically be a data sequence number (DSN) that allows the sender to have several packets in transit without waiting for the acknowledgement of each one before transmitting the next one. This is useful in multi-mode networking solutions where the ability to have several packets in transit at the same time is important for achieving reasonable throughput.

Figure 6:
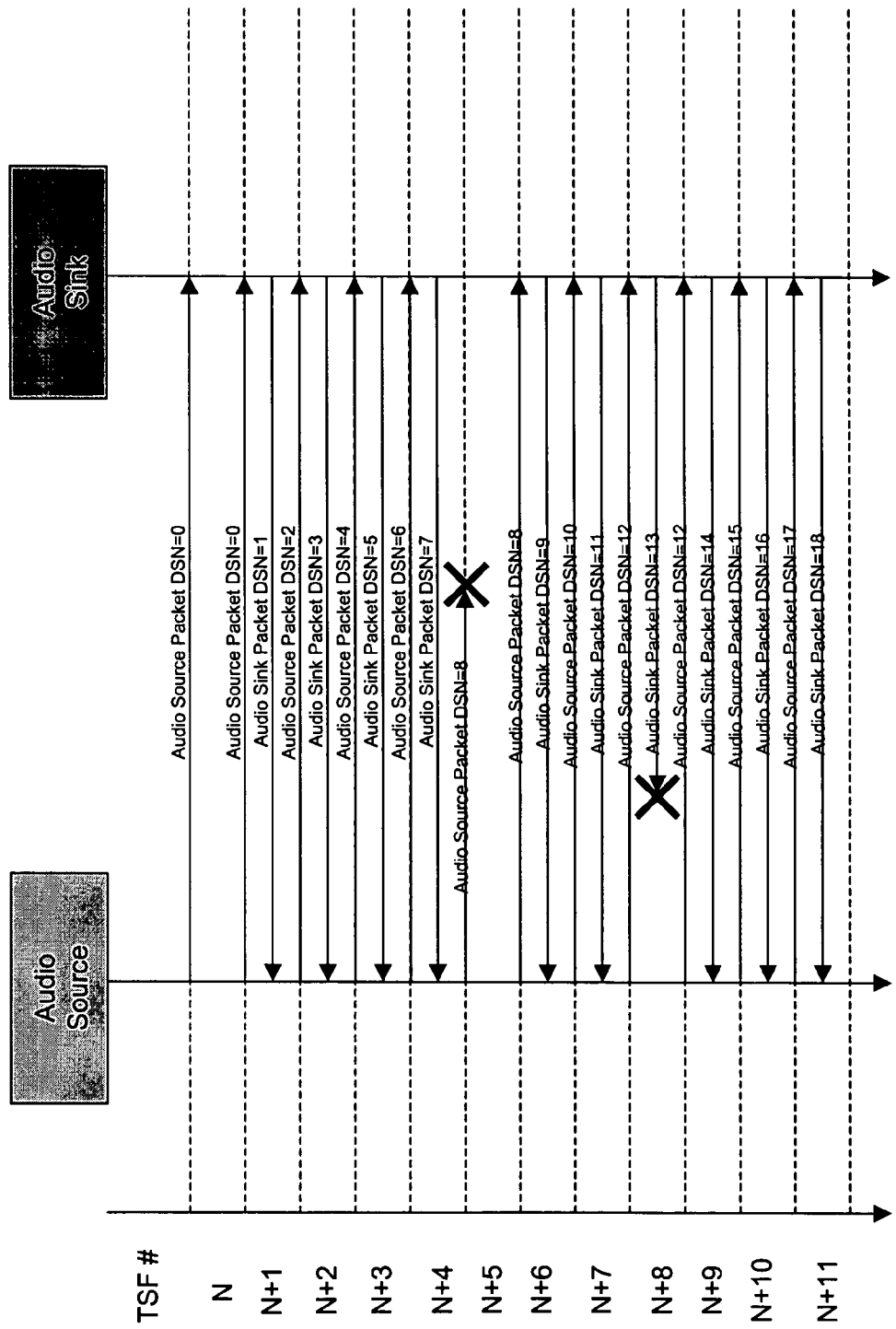
FIG. 6 depicts a packet acknowledgement scheme in accordance with the present invention.

In the solution of the present invention there is no explicit acknowledgement packet type. The fact that packets are 'ping-ponging' back and forth is exploited by making each packet serve as both a vehicle for sending data as well as an acknowledgement for the last good packet received. Referring to FIG. 6, each packet contains a DSN in the packet overhead. When one end transmits a packet with DSN=x, it expects to sees a DSN=x+1 in the next packet received from the other end. If it does, then it will transmit a new packet with DSN=x+2. If the original transmitted packet got lost or corrupted, then the next packet received from the other end, if there is one, will have DSN=x−1, in which case the DSN=x packet will be re-transmitted. If the packet from the other end gets lost or corrupted, then, again the DSN=x packet will be re-transmitted. This will continue until the DSN=x+1 packet is received, or a time-out occurs that declares the radio link to be bad. This may trigger a switch to another radio channel.

The implementation of acknowledged packet transmission with retransmission requires a buffer to hold the packet that was transmitted so that it can be retransmitted if it is not acknowledged. In addition, a wireless audio application where there is a continuous stream of audio must buffer the audio while the current packet is being transmitted. When the wireless shared media is poor such that frequent retransmissions are required, audio data can build up in the buffer awaiting the time when the wireless shared media clears up so that it can be transmitted.

Figure 7:
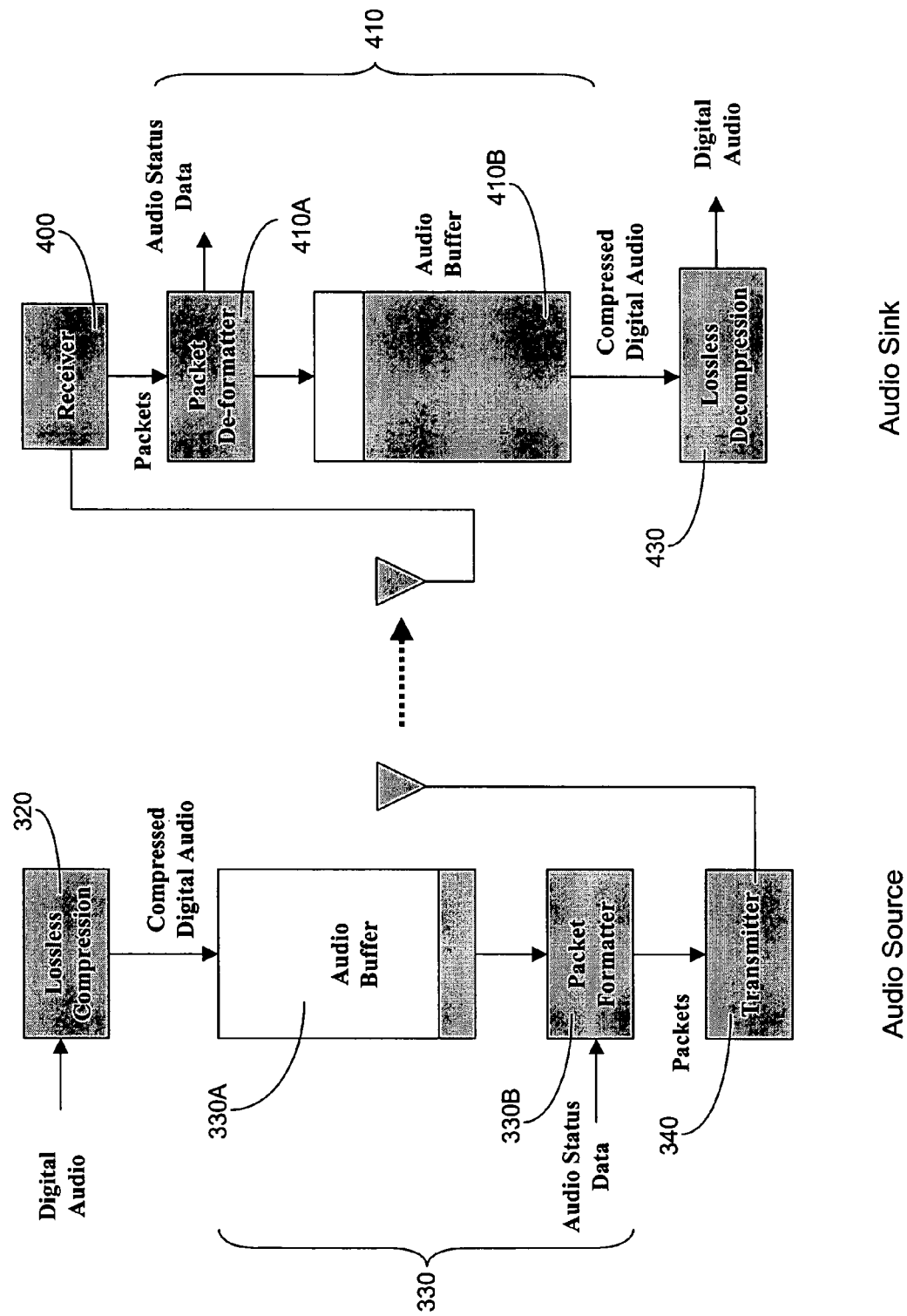
FIG. 7 depicts the audio buffer operation in accordance with the present invention.

Referring to FIG. 7, compressed digital audio is stored in an Audio Buffer 330A in Audio Source 200. When Audio Source 200 prepares a packet to be transmitted in the next TSF 500, it extracts audio data from the Audio Buffer 330A, combines it with audio status data and other packet overhead in Packet Formatter 330B and presents it to Transmitter 340. Audio Source 200 will extract as much audio data as it can from Audio Buffer 330A without exceeding the maximum allowable packet size.

As Audio Sink 210 receives packets from the Audio Source 200, it extracts the audio data at Packet De-Formatter 410A and stores it in Audio Buffer 410B. The compressed audio data is extracted from the Audio Buffer 410B, and decompressed. When audio data first starts to flow through this system, Audio Sink 210 will not extract any data from Audio Buffer 410B until it is almost full. Once it starts extracting data from Audio Buffer 410B, it cannot stop or else it will interrupt the smooth flow of audio.

When the wireless shared media is good, Audio Buffer 330A will stay relatively empty and Audio Buffer 410B will stay relatively full. When the wireless shared media is bad, Audio Buffer 330A at the transmitter will start to fill up and Audio Buffer 410B at the receiver will start to empty out as it continues the audio flow to an external device (e.g., headphone).

Dynamic TSF Interval

TSF 500 essentially controls the radio duty cycle (i.e. the amount of time the radio is transmitting versus receiving versus off) and therefore also affects the average power consumption of Audio Source 200 and Audio Sink 210. The instantaneous power consumption is defined by the peak consumption of the radio during receive, transmit and idle. The average power consumption is defined by the amount of time the radio is in receive mode, transmit mode and idle mode over the period of TSF 500. Average power consumption is important because it is the main factor affecting battery life.

Figure 8:
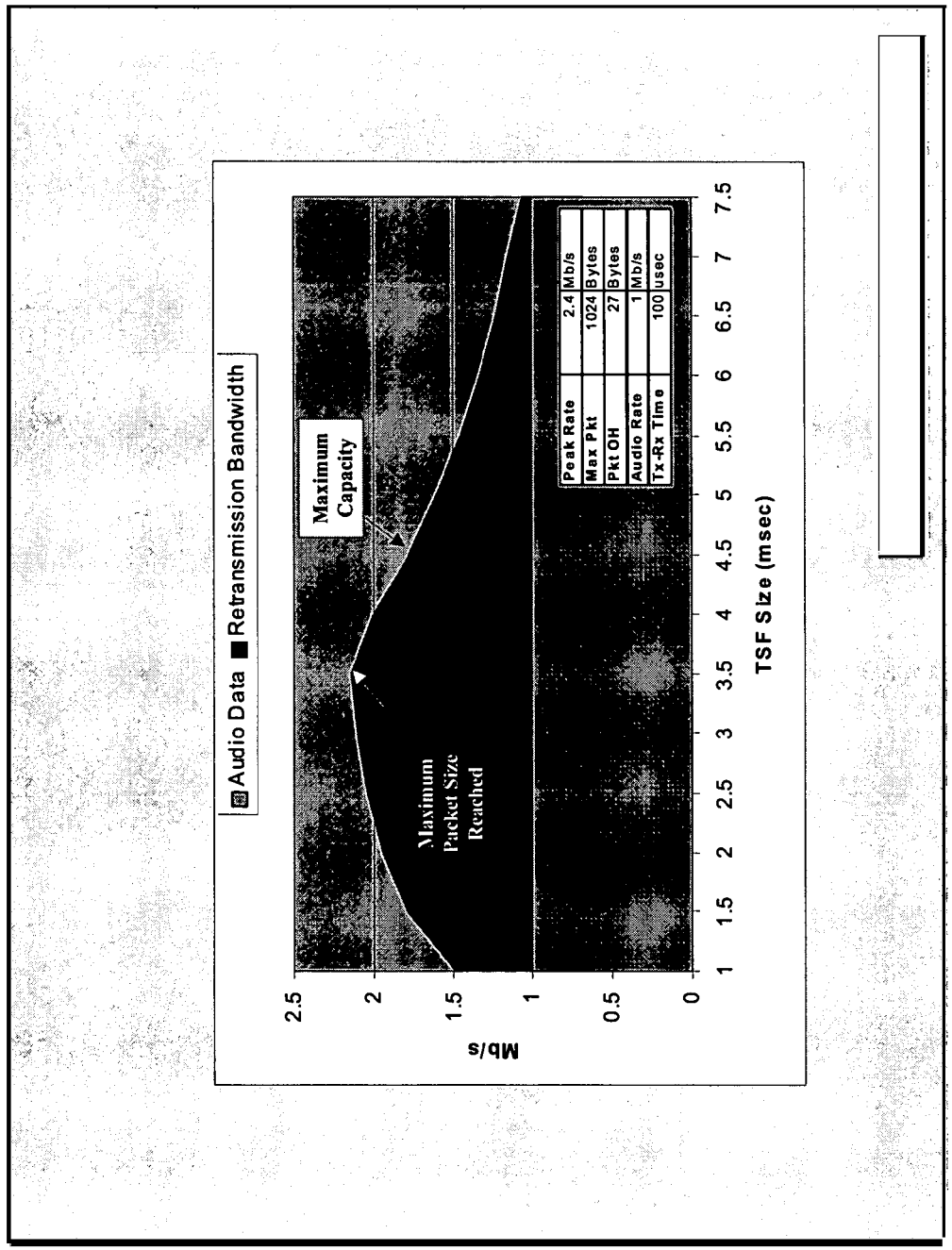
FIG. 8 depicts a graph showing the relationship between retransmission bandwidth availability and transport super frame size.
Figure 9:
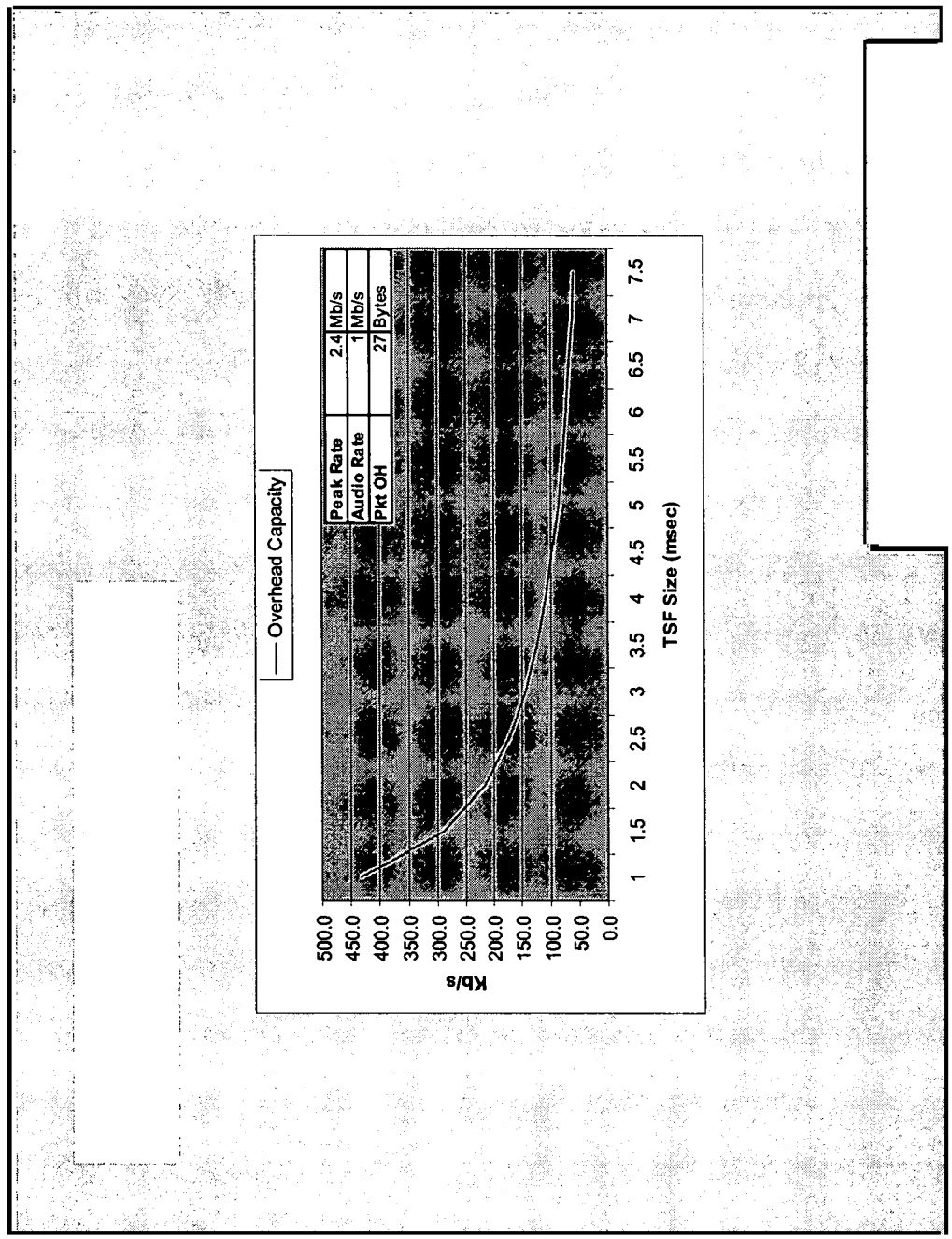
FIG. 9 depicts a graph showing the relationship between overhead capacity and transport super frame size.

Since audio source packet 510 is always transmitted at the beginning of TSF 500, a shorter TSF 500 means that audio source packets 510 are transmitted more frequently but the packet length may be constrained by the size of TSF 500. Conversely, a longer TSF 500 means that audio source packets 510 are transmitted less frequently but they can be longer packets up to the defined maximum. The total capacity available to carry audio therefore increases as the size of TSF 500 increases until the maximum packet size is reached, at which point the total capacity begins to decrease as the size of TSF 500 continues to increase. As shown in FIG. 8, since the compressed audio data rate is relatively fixed, the spare capacity available for retransmissions increases as the size of TSF 500 increases until the maximum packet size is reached, at which point it begins to decrease.

Since each packet (audio source packet 510 or audio sink packet 520) contains a relatively fixed amount of overhead regardless of packet length, longer packets result in less capacity being used up by overhead transmission, and power consumption is reduced. Therefore, power consumption is reduced by adjusting to a longer TSF 500. This is used to reduce power consumption when retransmission bandwidth is not required because the wireless shared media is good. It is also used when audio playback is inactive (since no capacity is required for audio) to reduce power consumption to an absolute minimum while maintaining the radio link.

Wireless shared media is imperfect, and data errors can occur due to a variety of causes. In radio communications, if the distance between transmitter and receiver is too long, there will be insufficient power arriving at the receiver for error-free reception. Multi-path effects may cause multiple copies of the signal arriving at the receiver with slightly different propagation delays, resulting in destructive interference and bit or burst errors. If other radios (e.g. WLAN, Bluetooth, cordless phones, microwave ovens) operating in the same frequency spectrum are within range, interference from them will also cause bit and burst errors.

Although a longer TSF results in longer packets and lower power consumption, the longer packets can also be more sensitive to wireless shared media errors. Arguably, the probability of interference hitting a small packet transmitted more frequently is about the same as the probability of hitting a large packet transmitted less frequently (this is arguable because more overhead is transmitted with the small packet and the impact of hitting overhead is the same as the impact of hitting the data payload). However, if the errors are predominantly bit errors, or small bursts (small relative to the packet size), then the retransmission of long packets, results in the retransmission of more 'good' information, whereas the retransmission of short packets has less 'good' information retransmitted and therefore requires less time and bandwidth to perform the retransmission. Therefore, a shorter TSF 500 that results in shorter packets sizes means less retransmission bandwidth is required. However, a longer TSF 500 results in more retransmission bandwidth being available, up to a point. Therefore, there is an optimum length of TSF 500 that balances the need for and availability of retransmission bandwidth.

Figure 10:
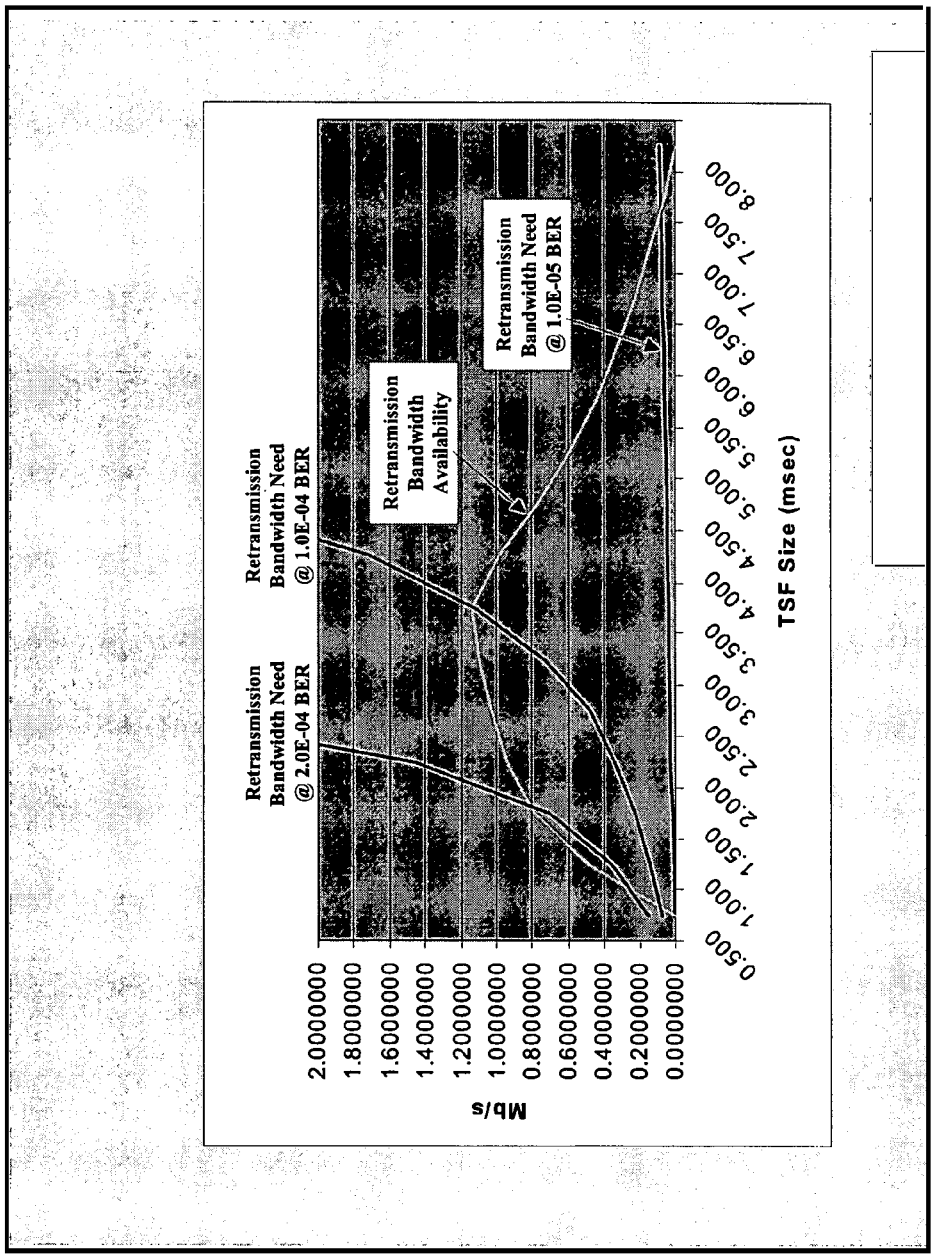
FIG. 10 depicts a graph showing the relationship between interference robustness and transport super frame size.
Figure 11:
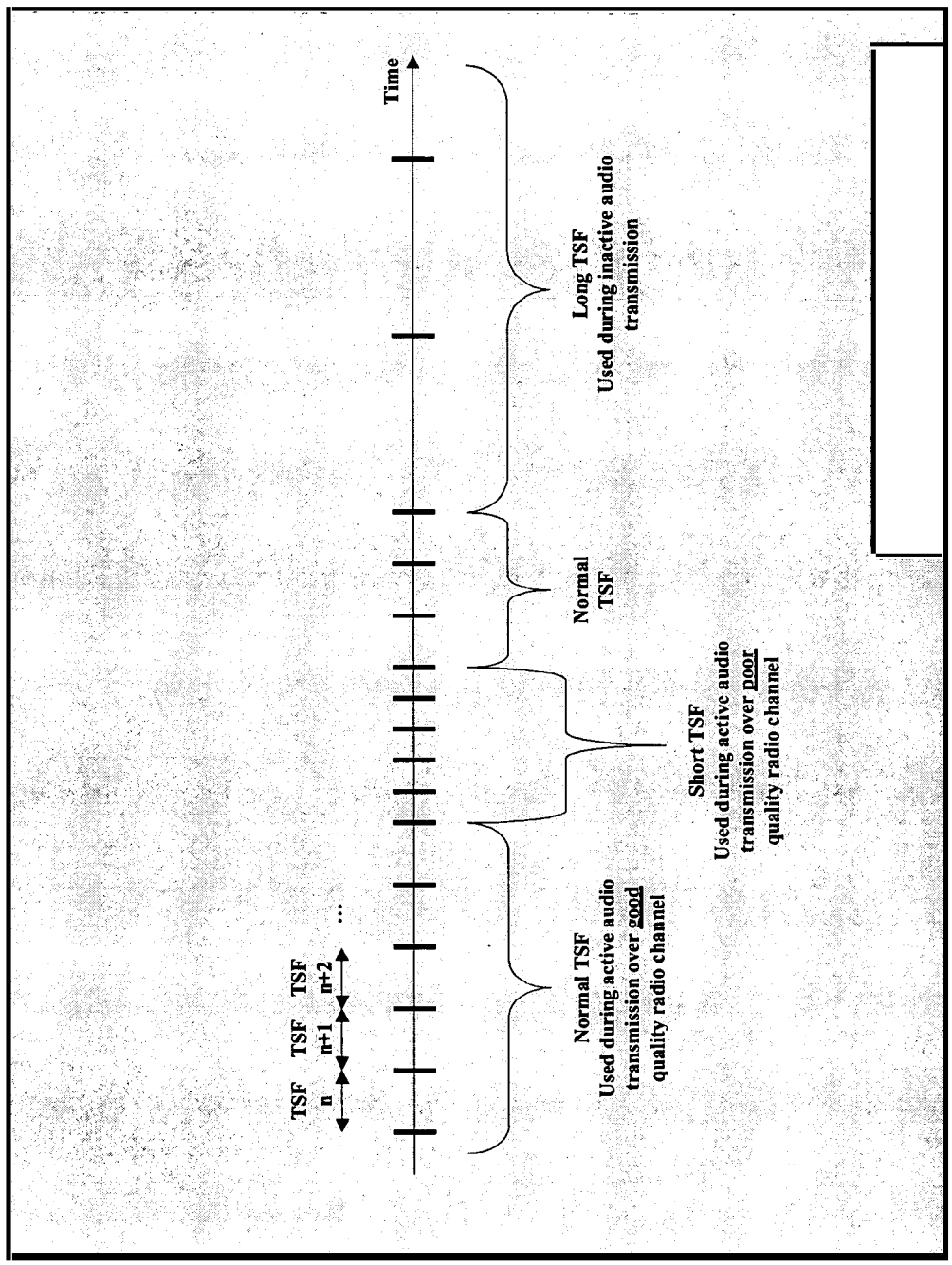
FIG. 11 depicts examples of varying TSF lengths used to accommodate interference in the wireless shared media.

FIG. 10 shows how interference robustness (the difference between the need for retransmission bandwidth and the availability of retransmission bandwidth) varies with the size of TSF 500. At lower error rates, there are a wide range of sizes of TSF 500 that will satisfy the need for retransmission bandwidth. However, as the error rate increases, only smaller sizes of TSF 500 will satisfy the need. It is also important to note that the power consumption is also higher when using short packets. Therefore, controlling TSF 500 allows the radio to adjust to present conditions, using a longer TSF 500 when the wireless shared media is good (or audio bandwidth is not required) to optimize power consumption, and using a shorter TSF when the wireless shared media is poor to optimize error-correction.

In short, dynamic TSF control is used to address the trade-off between power consumption and interference robustness. When Channel Quality Monitor 370 associated with Audio Source 200 determines that the channel is deteriorating, it will instruct Audio Synchronizer 310 to switch to a shorter TSF 500. The new TSF 500 will be communicated to Audio Sink 210 in the packet overhead. Upon reception of a packet with the new TSF 500, Audio Sink 210 will also switch to the shorter TSF 500.

Audio Synchronization Using TSF Interval

Digital audio data must be converted back to an analog signal before the amplification required to drive speakers. The digital to analog conversion requires a clock that must have low jitter and be exactly synchronous with respect to the audio sampling clock that was originally used to convert the analog audio to digital. In the solution of the present invention, the Audio Source synchronizes the TSF to the local audio sampling clock. Thus, at the audio sink the arrival of the first bit of each audio source packet is a frequency reference that is synchronous to that audio sampling clock. The audio sink uses this reference in a phase or frequency locked loop to recreate the sampling clock.

In the solution of the present invention, Audio Source 200 synchronizes TSF 500 to the local audio sampling clock generated by Audio Synchronizer 310. Thus, at Audio Sink 210 the arrival of the first bit of each audio source packet 510 is a frequency reference that is synchronous to that audio sampling clock. Audio Sink 210 uses this reference in a phase or frequency locked loop to recreate the sampling clock.

Lossless Compression

In general, digital audio data that is received at Audio Sink 210 with no data errors or loss will have the same audio quality as it had at Audio Source 200. In other words, the audio quality will not be limited by the radio transmission. A single bit error is audible. An error of one of the Least Significant Bits (LSBs) of an audio sample is less audible than an error of one of the Most Significant Bits (MSBs). An LSB error may sound like a quiet 'click' to a user whereas an MSB error may sound like a loud 'pop'. Burst errors will also sound like loud 'pop's. Frequent bit errors may sound like radio 'static'.

Some audio transmission methods use compression to reduce the amount of audio data that needs to be transmitted and thereby reduces the capacity required by the transmission medium. The impact of data transmission errors is affected by the use of compression. As those skilled in the art will appreciate, compression methods can be divided into two groups (lossy compression and lossless compression):

(a) Lossy Compression is based on a psychoacoustic model of the human hearing mechanism. The audio signal is broken down into frequency components and those components that are less audible to the human ear are eliminated. Such methods can result in very high compression ratios: as much as 20:1. However, audio quality is affected because audio information is lost and in general, the greater the compression ratio, the greater the impact. Such compression methods also tend to be computationally complex and require significant power consumption to perform in real-time. MP3 compression is an example of a Lossy Compression method; and (b) Lossless Compression exploits inherent redundancy in audio information, transmitting base samples (redundant information) infrequently, and for the remaining samples transmitting only the difference from the base. Such methods can achieve compression ratios of up to 3:1 but the compression ratio is dependant on the type of audio (some types of audio have more redundancy than others). However, no information is lost; the original audio data can be completely reconstructed such that audio quality is not affected.

In general, the higher the compression ratio, the greater the impact of errors since more information is contained in each bit. With lossy compression, errors cause frequency distortion resulting in 'echoes' and 'warbles'. With lossless compression, base samples comprise about 20% of the transmitted capacity and the remaining 80% essentially represents the LSBs of the audio samples. Thus bit errors on losslessly compressed audio sound mostly like quiet 'clicks'.

The solution of the present invention uses lossless compression to maximize audio quality while reducing the required audio capacity. This has two benefits. It reduces the radio duty cycle when the wireless shared media is good, thus reducing power consumption. And it makes more capacity available for retransmission when the wireless shared media is poor.

Dynamic Channel Selection and Switching

In order to establish a wireless connection across the multi-channel shared media, Audio Source 200 and Audio Sink 210 must be using the same channel. Ideally, this channel is also the best available channel, in terms of its quality, or ability to support error-free audio transmission.

The Channel Quality Monitor 370 associated with Audio Source 200 maintains a Preferred Channel Sequence (PCS), which is a list of the channels in the shared media in order of their desirability. The list is biased by knowledge of channels that are more likely to experience poor quality in the future. For example, radio channels that overlap spectrum used by known interferers would be biased low on the PCS. Prior to establishing a connection, Audio Source 200 scans the available channels looking for signal energy. High energy is interpreted to be an occupied channel and therefore undesirable and again the channel will end up low on the PCS. After Audio Source 200 has derived the PCS, it will start transmitting on the most preferred channel. Audio Source 200 will periodically re-scan the available channels after starting transmission in order to keep the PCS current.

Once a connection has been established with Audio Sink 210, Audio Source 200 will send the PCS to Audio Sink 210. Channel Quality Monitor 370 associated with Audio Source 200 and Audio Sink 210 will continuously monitor signal energy, rate of missing acknowledgements, and Audio Buffer 330A fill to derive an assessment of the quality of the current channel.

Figure 12:
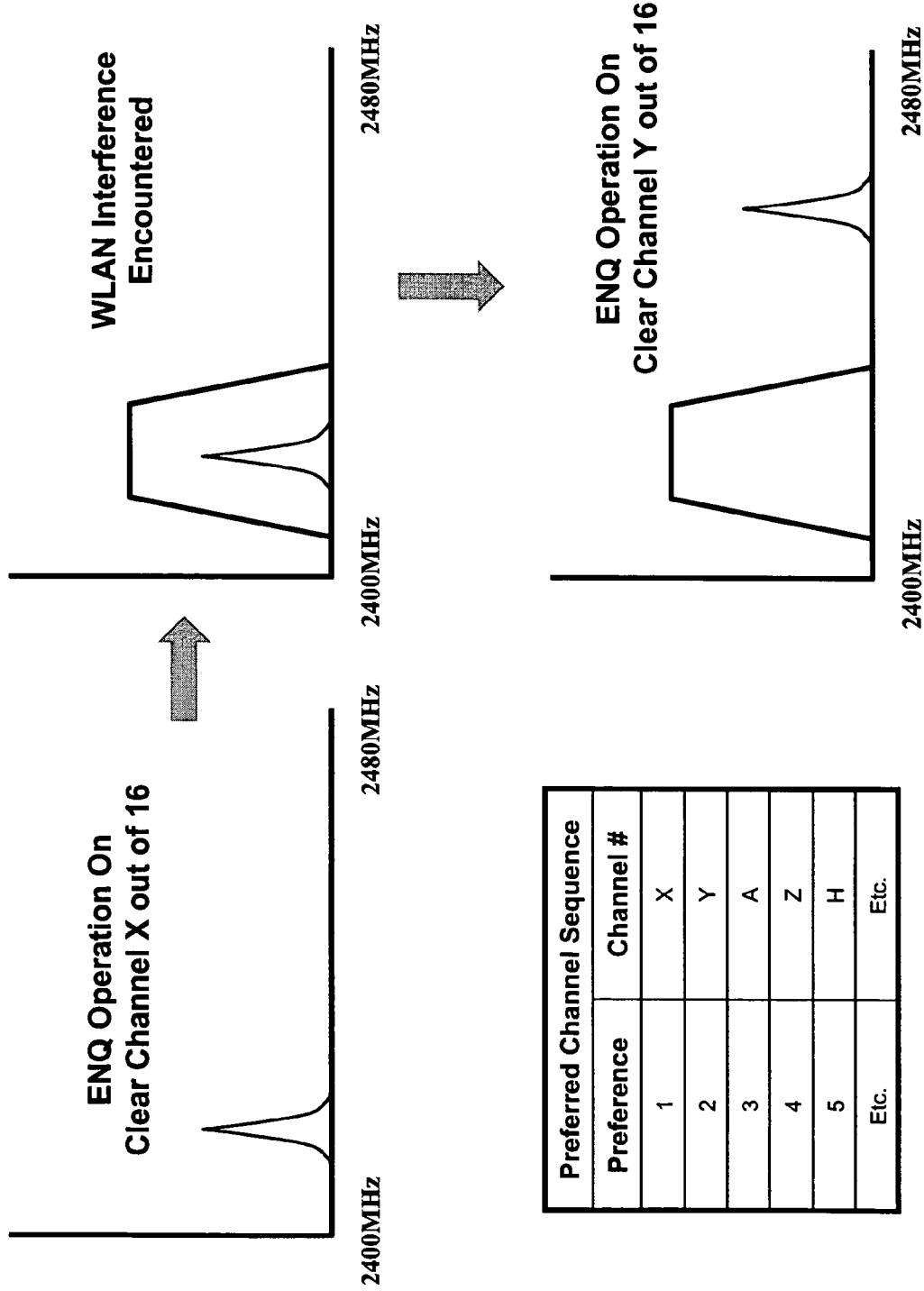
FIG. 12 depicts a chart depicting the thresholds at which dynamic channel switching will be initiated.

If the quality drops below a pre-defined threshold for a pre-defined amount of time, the Channel Quality Monitor 370 triggers a Dynamic Channel Switch (DCS). Referring to FIG. 12, if Audio Source 200 is operating in channel X of 16 possible channels, and if channel X encounters interference from, for example a wireless local area network (WLAN), then Audio Source 200 will move to the next preferred channel (shown as "Y") in the PCS and if it is still a good channel, will start transmitting there and wait for Audio Sink 210 to find it. Audio Sink 210 will also move to the next channel in the PCS and look for Audio Source 200. While this is taking place, audio continues to accumulate in Audio Buffer 330A associated with Audio Source 200, and audio continues to play out of the Audio Buffer 330A. The use of missing acknowledgements ensures that Audio Source 200 and Audio Sink 210 will decide to abandon the current channel at approximately the same time. An additional delay is applied before Audio Sink 210 switches in order to give Audio Source 200 time to start transmitting on the new channel.

FIG. 13 provides a decision matrix used by Channel Quality Monitor 370 while transmission is active to determine the appropriate interference avoidance action—specifically, whether to invoke dynamic TSF interval or dynamic channel selection. The channel energy on the selected channel (e.g. Y) and Audio Buffer 330A fill are continuously monitored (Note: the rate of missing acknowledgements may also be used in place of Audio Buffer 330A fill). If the channel energy is high but Audio Buffer 330A fill is deteriorating (i.e. the buffer is filling up due to frequent retransmissions), it is deduced that the high channel energy is a result of interference. Initially, a shorter TSF interval is chosen to see if the deteriorating buffer condition is resolved. If not, then dynamic channel switching is triggered. If the channel energy is low but Audio Buffer 330A fill is deteriorating, then it is deduced that interference is not the cause. A shorter TSF interval is then chosen. If this does not resolve the problem, then Audio Sink 210 is considered to be out of range of Audio Source 200 and the user is given an out of range signal. Finally, if the channel energy is low but Audio Buffer 330A fill is stable, it is deduced that Audio Sink 210 is approaching out of range of Audio Source 200 and the user is given an out of range signal.

Dynamic Transmit Power

Figure 14:
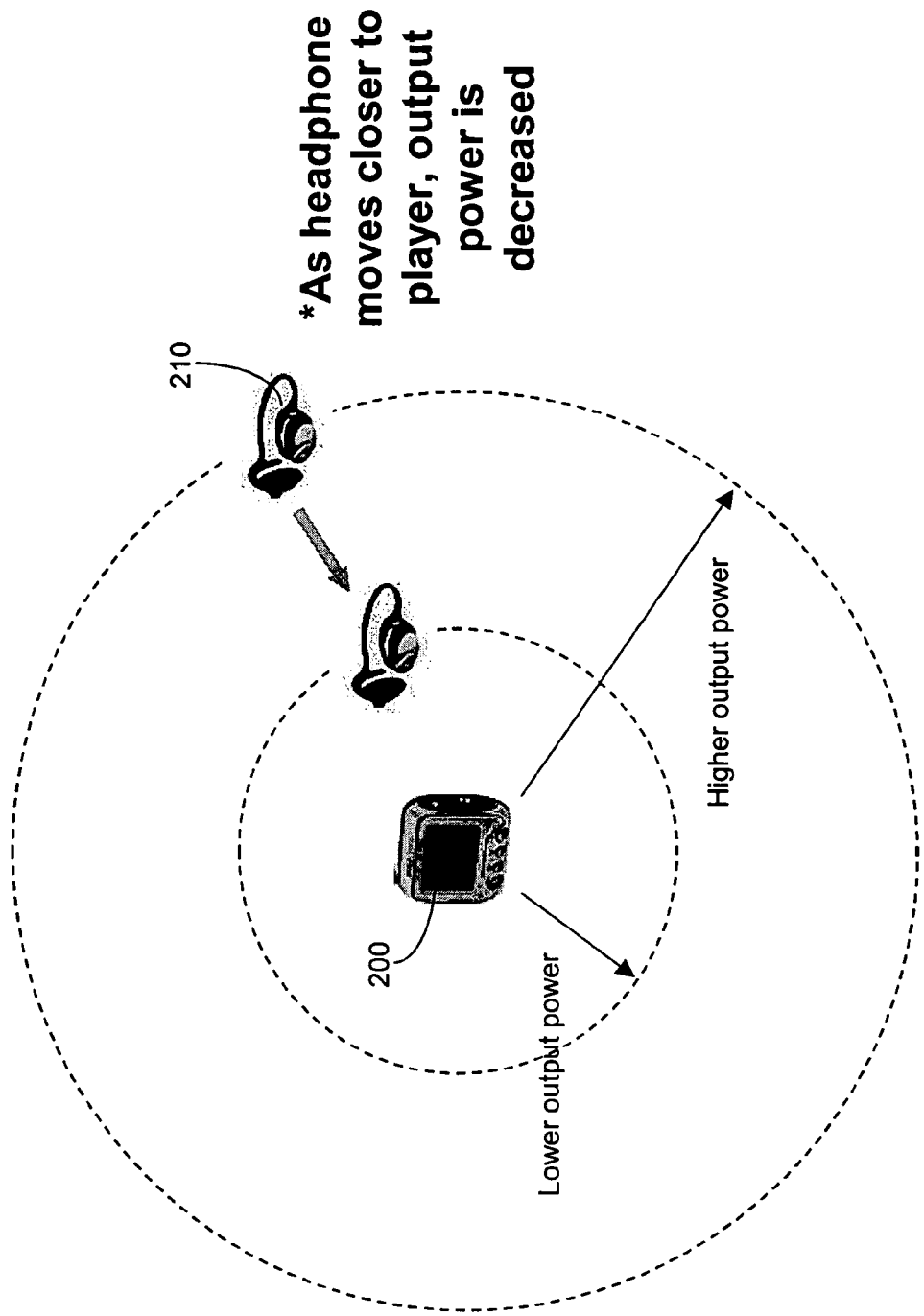
FIG. 14 depicts graphically the application of the dynamic transmit power feature of the present invention.

Depending on the link budget of the radio, there may be significant signal to noise ratio (SNR) margin available to combat interference. However, if the wireless shared media is good (i.e. based on quality measurement of the in use channel), the output power of transmitter 340 can be reduced. As shown in FIG. 14, as Audio Sink 210 gets closer to Audio Source 200 less output power is required. This has the effect of reducing power consumption at transmitter 340. It also has the effect of reducing the interference caused on other radios. Thus the distance required between personal audio devices before a channel can be reused is reduced, freeing up other channels to be used by Dynamic Channel Switching to combat other sources of interference.

Figure 15:
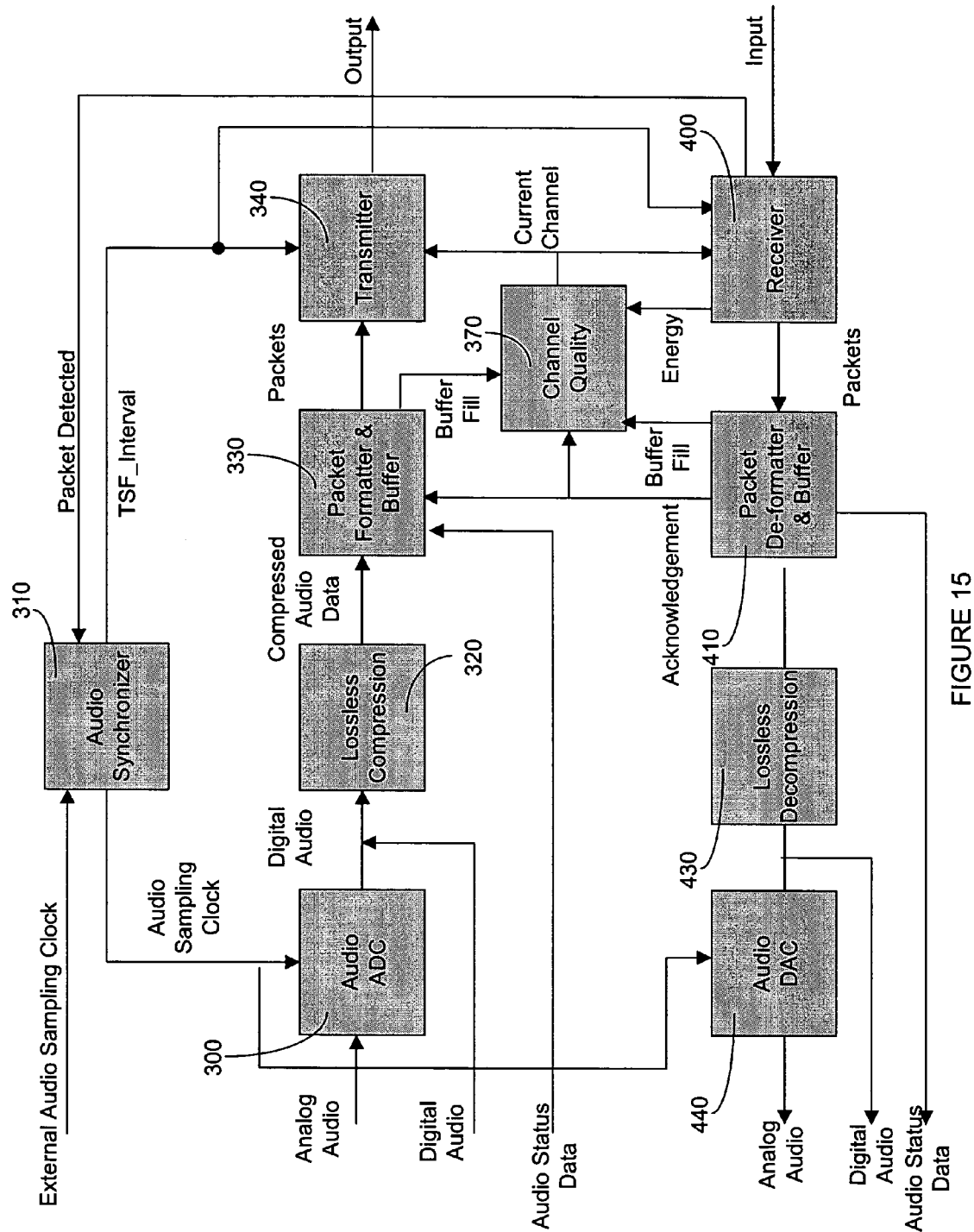
FIG. 15 depicts an alternate embodiment of the audio source which supports bi-directional audio transmission.

Although various exemplary embodiments of the invention have been disclosed, it should be apparent to those skilled in the art that various changes and modifications can be made which will achieve some of the advantages of the invention without departing from the true scope of the invention. For example, the following modifications are meant to be included within the scope of the invention:

(a) Analog or digital audio data can be supplied to Audio Source 200. If digital audio data is supplied, Audio ADC 300 is not required;

(b) Analog or digital audio data can be produced by Audio Sink 210. If digital audio data is produced, the Audio DAC 440 is not required;

(c) The method of audio compression can be lossless, as described above, or lossy. Lossy compression allows for much greater compression ratios thereby reducing the audio bandwidth requirement. However, lossy compression reduces audio quality and it is much more complex and therefore consumes more power than lossless compression. The potential benefit of using lossy compression depends on the peak power consumption of the radio since there is a trade-off between the higher power consumption of the compression/decompression and the lower average power consumption of the radio because of the lower data rate;

(d) If the audio data rate is sufficiently low relative to the peak bit rate of the wireless connection, compression can be eliminated altogether;

(e) The present invention can be adapted to support multiple audio sinks all listening to the same audio source at the same time. However, only one audio sink can send audio control data. The additional audio sinks can only receive audio data and audio status data;

(f) The shared media could be wired;

(g) The wireless shared media could be radio, infra-red, or something equivalent; and (h) The present invention could be adapted to support bi-directional audio transmission such as would be used between a cellular phone and wireless headset. The system configuration for this application is shown in FIG. 15. In this configuration, the transmit path of Audio Source 200 (i.e. components 300, 320, 330 and 340) is combined with the receive path of Audio Sink 210 (i.e. components 400, 410, 430 and 440) to provide bi-directional audio communication. Each end of the connection would have the identical configuration, however, one end would have to be assigned to be Master and the other end to be Slave with respect to the Audio Synchronization, and Dynamic Channel Selection and Switching functions.

In general, the present invention can be applied to any application that requires point-to-point wireless communication of streaming isochronous (i.e. transmissions that require timing coordination to be successful) digital data, including voice.

As will be understood by those skilled in the art, the functionality described in the specification may be obtained using hardware or a combination of hardware and software. The software may be implemented as a series of computer readable instructions stored in a microprocessor. The computer readable instructions may be programmed in a procedural programming language (e.g. "C") or an object oriented language (e.g. "C++"). Preferably, the components comprising Audio Source 200 and Audio Sink 210 are formed within respective integrated circuits which may be used in combination with other on-chip or off-chip components to perform the function described herein.

Persons skilled in the field of radio frequency and integrated circuit may now conceive of alternative structures and embodiments or variations of the above all of which are intended to fall within the scope of the invention as defined in the claims that follow.

We claim:

1. A wireless audio system comprising:

an audio source for receiving audio signals and audio status information from a first external device and transmitting said audio signals and said audio status information over a wireless connection; and at least one audio sink for receiving said audio signals and said audio status information from said audio source and communicating said audio signals and said audio status information to a second external device, wherein a specified one of said at least one audio sink receives audio control information from said second external device and transmits said audio control information to said audio source via said wireless connection, wherein said wireless connection uses a specified one of a plurality of available channels, and wherein said audio source comprises:

a source packet formatter and buffer communicating with said first external devices, wherein said source packet formatter creates a plurality of source transmit packets containing said audio signals and said audio status information, and wherein said source buffer stores said plurality of source transmit packets prior to transmission to said audio sink;

a source transmitter communicating with said source packet formatter and buffer for receiving said plurality of source transmit packets from said source buffer and transmitting said plurality of source transmit packets to said audio sink every defined unit of time;

a source audio synchronizer communicating with said source transmitter for defining said unit of time for said source transmitter;

a source receiver for receiving said audio control information from said audio sink, wherein said audio control information is in the form of a plurality of sink transmit packets, and wherein said audio source receiver communicates with said source transmitter to coordinate said receiving and transmitting within respective ones of said defined units of time;

a source packet de-formatter communicating with said source receiver for receiving said plurality of sink transmit packets and extracting said audio control information; and a source channel quality monitor communicating with said source packet de-formatter and source transmitter for monitoring said specified in use one of said plurality of available channels.

2. The wireless audio system of claim 1 wherein said audio signals are taken from the group comprising digital and analog.

3. The wireless audio system of claim 2 wherein said first external device is taken from the group comprising compact disc (CD) player, MP3 player and mini-disk player.

4. The wireless audio system of claim 2 wherein the second external device is taken from the group comprising headphones and a remote control.

5. The wireless audio system of claim 1 wherein said audio status information is taken from the group comprising song title, song artist and song number.

6. The wireless audio system of claim 1 wherein said audio control information comprises a command taken from the group comprising play, stop, rewind, fast forward, skip and pause.

7. The wireless audio system of claim 1 wherein said wireless connection is a radio frequency connection.

8. The wireless audio system of claim 1 wherein said wireless connection is an infra-red connection.

9. The wireless audio system of claim 7 wherein said radio frequency connection is a time division duplex radio frequency connection.

10. The wireless audio system of claim 9 wherein said audio sink comprises:

a sink receiver for receiving said plurality of source transmit packets from said audio source every defined unit of time;

a sink packet de-formatter and buffer communicating with said sink receiver, wherein said sink packet de-formatter extracts said audio signals and said audio status information from said source transmit packets, and wherein said sink buffer stores said extracted audio signals and said audio status information;

a sink audio synchronizer communicating with said sink receiver for defining said unit of time for said sink receiver;

a sink packet formatter communicating with said second external device for creating said plurality of sink transmit packets containing said audio control information;

a sink transmitter communicating with said sink packet formatter for transmitting said plurality of sink transmit packets, wherein said sink receiver communicates with said sink transmitter to coordinate said receiving and transmitting within specified ones of said defined units of time; and a sink channel quality monitor communicating with said sink packet de-formatter and buffer and said sink receiver for monitoring said specified in use one of said plurality of available channels.

11. The wireless audio system of claim 10 wherein, if an analog audio signal is delivered from said first external device said wireless audio system further comprises an analogue-to-digital converter (ADC) communicating with said first external device, and wherein a source audio sampling clock signal generated by said source audio synchronizer is fed to said ADC.

12. The wireless audio system of claim 11 wherein, if an analog audio signal is required by said second external device, said wireless audio system further comprises a digital-to-analogue converter (DAC), and wherein a sink audio sampling clock signal generated by said sink audio synchronizer is fed to said DAC.

13. The wireless audio system of claim 12 further comprising a compression module communicating with said ADC for compressing digital audio signals outputted by said ADC.

14. The wireless audio system of claim 13 further comprising a decompression module communicating with said sink packet de-formatter and buffer for decompressing said digital audio signals received from said sink buffer.

15. The wireless audio system of claim 10 wherein said defined unit of time is a transport super frame interval (TSF_Interval).

16. The wireless audio system of claim 15 wherein specified ones of said plurality of source and sink transmit packets are contained within a specified TSF_Interval, and wherein said TSF_Interval further comprises and idle period.

17. The wireless audio system of claim 10 wherein a specified one of said plurality of sink transmit packets also comprises an acknowledgement that a specified one of said plurality of source transmit packets has been received by said source receiver, and wherein said acknowledgement comprises a data sequence number (DSN), and wherein said DSN is contained in an overhead portion associated with said specified one of said plurality of sink transmit packets.

18. The wireless audio system of claim 17 wherein said source packet formatter and buffer sends a next one of said plurality of source transmit packets when a sequential DSN number has been received by said source receiver.

19. The wireless audio system of claim 18 wherein, if a specified one of said plurality of source transmit packets is not received by said sink receiver, said specified one of said plurality of source transmit packets is retransmitted upon receipt of a non-sequential DSN by said source receiver.

20. The wireless audio system of claim 15 wherein said TSF_Interval is 4 m/sec, and wherein said plurality of source and sink transmit packets are received at a bit rate of 2.4 Mb/s, and wherein said audio sampling clock signal is 44.1 KHz.

21. The wireless audio system of claim 15 wherein, upon receiving an indication at said source channel quality monitor that said specified in use one of said plurality of available channels is deteriorating, said source audio synchronizer is instructed by said source channel quality monitor to shorten said TSF_Interval and wherein said shortened TSF_Interval is communicated to said audio sink in an overhead portion associated with a specified one of said plurality of source transmit packets.

22. The wireless audio system of claim 12 wherein a frequency reference synchronous to said source audio sampling clock signal is contained within a specified one of said plurality of source transmit packets, and wherein, upon receipt of said specified one of said plurality of source transmit packets by said sink receiver, said frequency reference is forwarded to said sink audio synchronizer to generate said sink audio sampling clock signal.

23. The wireless audio system of claim 14 wherein said compression module associated with said audio source and said decompression module associated with said sink are lossy compression modules.

24. The wireless audio system of claim 14 wherein said compression module associated with said audio source and said decompression module associated with said sink are lossless compression modules.

25. The wireless audio system of claim 21 wherein said source channel quality monitor maintains a preferred channel sequence (PCS) comprising a list of said plurality of available channels, and wherein, if a quality measurement associated with said specified in use one of said plurality of available channels falls below a pre-defined threshold, then said source channel quality monitor switches to a subsequent channel in said PCS.

26. The wireless audio system of claim 25 wherein said quality measurement is a pre-defined signal energy level associated with said specified in use one of said plurality of available channels.

27. The wireless audio system of claim 25 wherein said quality measurement is a pre-defined level associated with said source buffer.

28. The wireless audio system of claim 25 wherein a specified one of said plurality of sink transmit packets also comprises an acknowledgement that a specified one of said plurality of source transmit packets has been received by said source receiver, and wherein said quality measurement is a pre-defined number of missed ones of said acknowledgements.

29. The wireless audio system of claim 25 wherein, prior to establishing a wireless connection from said audio source to said audio sink, said source channel quality monitor scans said PCS and determines a preferred one of said plurality of available channels.

30. The wireless audio system of claim 25 wherein, once a wireless connection from said audio source to said audio sink is established, said audio source periodically re-scans said list of said plurality of available channels to determine if an updated list is required.

31. The wireless audio system of claim 25 wherein said quality measurement is a combination of a pre-defined signal energy level associated with said specified in use one of said plurality of available channels, and a pre-defined level associated with said source buffer.

32. The wireless audio system of claim 31 wherein, if said pre-defined signal energy level is high and said pre-defined source buffer level is deteriorating, then said TSF_Interval is shortened, and wherein if said specified in use one of said plurality of available channels continues to deteriorate said subsequent channel in said PCS is selected.

33. The wireless audio system of claim 10 wherein, if a quality measurement associated with said specified in use one of said plurality of available channels is above a pre-defined threshold, a power output associated with said source transmitter is reduced.

34. In a wireless audio system, an audio source comprising:
a source packet formatter and buffer communicating with a first external device, wherein said source packet formatter creates a plurality of source transmit packets containing audio signals and audio status information, and wherein said source buffer stores said plurality of source transmit packets prior to transmission to an audio sink;
a source transmitter communicating with said source packet formatter and buffer for receiving said plurality of source transmit packets from said source buffer and transmitting said plurality of source transmit packets to said audio sink every defined unit of time;
a source audio synchronizer communicating with said source transmitter for defining said unit of time for said source transmitter;
a source receiver for receiving audio control information from said audio sink, wherein said audio control information is in the form of a plurality of sink transmit packets, and wherein said source receiver communicates with said source transmitter to coordinate said receiving and transmitting within respective ones of said defined units of time;
a source packet de-formatter communicating with said source receiver for receiving said plurality of sink transmit packets and extracting said audio control information; and
a source channel quality monitor communicating with said source packet de-formatter and source transmitter for monitoring a specified one of a plurality of available channels.

35. In a wireless audio system, an audio sink comprising:
a sink receiver for receiving a plurality of source transmit packets from an audio source every defined unit of time, wherein said plurality of source transmit packets comprise audio signals and audio status information;
a sink packet de-formatter and buffer communicating with said sink receiver, wherein said sink packet de-formatter extracts said audio signals and said audio status information from said source transmit packets, and wherein said sink buffer stores said extracted audio signals and said audio status information;
a sink audio synchronizer communicating with said sink receiver for defining said unit of time for said sink receiver;
a sink packet formatter communicating with a second external device for creating a plurality of sink transmit packets containing audio control information;
a sink transmitter communicating with said sink packet formatter for transmitting said plurality of sink transmit packets, wherein said sink receiver communicates with said sink transmitter to coordinate said receiving and transmitting within specified ones of said defined units of time; and
a sink channel quality monitor communicating with said sink packet de-formatter and buffer and said sink receiver for monitoring a specified one of a plurality of available channels.

36. The wireless audio system of claim 34 wherein said first external device is taken from the group comprising compact disc (CD) player, MP3 player and mini-disk player.

37. The wireless audio system of claim 35 wherein the second external device is taken from the group comprising headphones and a remote control.

38. The wireless audio system of claim 36 wherein, if an analog audio signal is delivered from said first external device said wireless audio system further comprises an analogue-to-digital converter (ADC) communicating with said first external device, and wherein a source audio sampling clock signal generated by said source audio synchronizer is fed to said ADC.

39. The wireless audio system of claim 37 wherein, if an analog audio signal is required by said second external device, said wireless audio system further comprises a digital-to-analogue converter (DAC), and wherein a sink audio sampling clock signal generated by said sink audio synchronizer is fed to said DAC.

40. The wireless audio system of claim 38 further comprising a compression module communicating with said ADC for compressing digital audio signals outputted by said ADC.

41. The wireless audio system of claim 39 further comprising a decompression module communicating with said sink packet de-formatter and buffer for decompressing said digital audio signals received from said sink buffer.

42. A bi-directional wireless audio system comprising:
a packet formatter and buffer communicating with an external device, wherein said source packet formatter creates a plurality of transmit packets containing transmit audio signals and audio status information, and wherein said buffer stores said plurality of source transmit packets prior to transmission;

a transmitter communicating with said packet formatter and buffer for receiving said plurality of transmit packets from said buffer and transmitting said plurality of transmit packets every defined unit of time;

an audio synchronizer communicating with said transmitter for defining said unit of time for said transmitter;

a receiver for receiving receive audio signals and audio status information, wherein said receive audio signals and audio status information are in the form of a plurality of receive packets, and wherein said receiver communicates with said transmitter to coordinate said receiving and transmitting within respective ones of said defined units of time;

a packet de-formatter and buffer communicating with said receiver and said external device for receiving said plurality of receive packets and extracting said receive audio signals and audio status information; and a channel quality monitor communicating with said packet de-formatter and buffer and said transmitter, for monitoring a specified one of a plurality of available channels, wherein, if an analog audio signal is delivered from said external device, said bi-directional wireless audio system further comprises an analogue-to-digital converter (ADC) communicating with said external device, and wherein an audio sampling clock signal generated by said audio synchronizer is fed to said ADC, and wherein, if an analog audio signal is required by said external device, said wireless audio system further comprises a digital-to-analogue converter (DAC) communicating with said packet de-formatter and buffer, and wherein said audio sampling clock signal is fed to said DAC.

43. The bi-directional wireless audio system of claim 42 wherein said external device is a cellular phone.

44. The bi-directional wireless audio system of claim 42 wherein said external device is a wireless headset.

* * * * *